Patented Aug. 14, 1923.

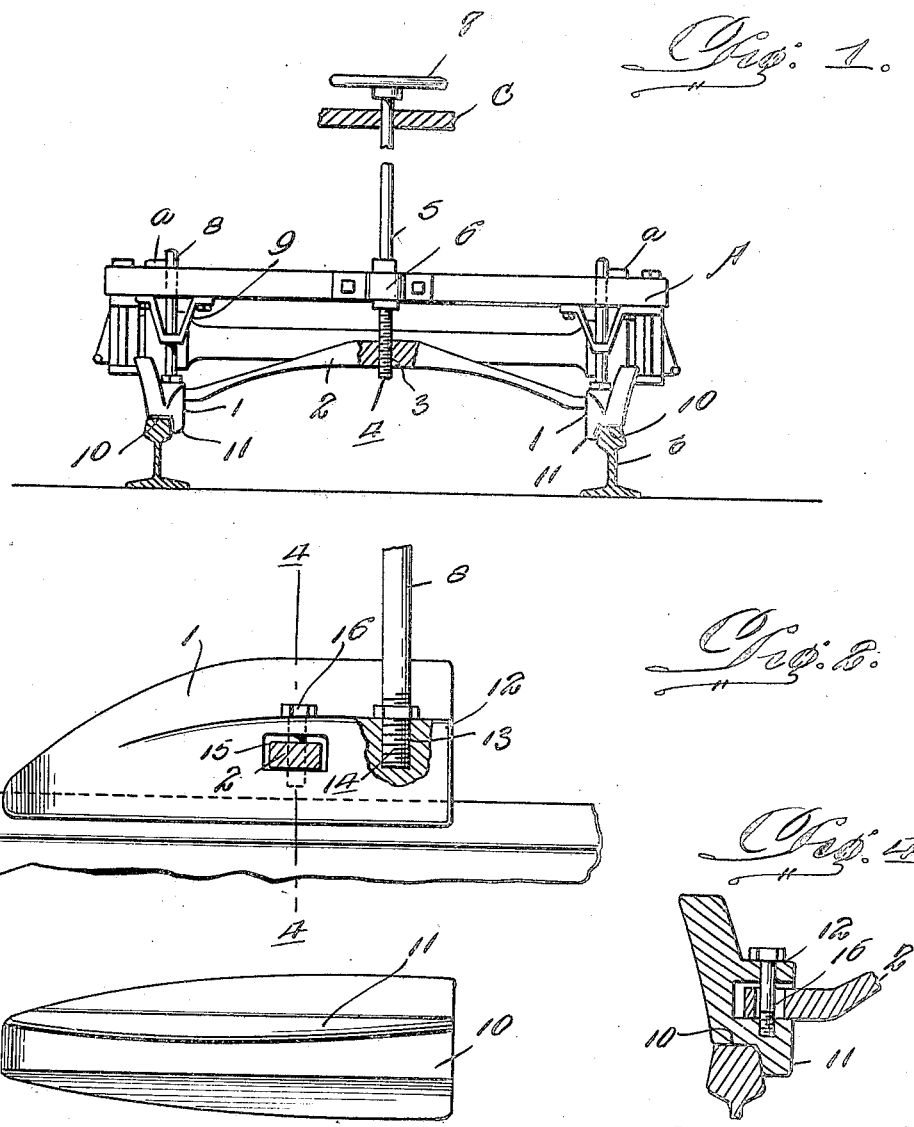

1,464,921

UNITED STATES PATENT OFFICE.

HARRY A. BERKOWITZ, OF WILKES-BARRE, PENNSYLVANIA.

ICE SCRAPER FOR RAILS.

Application filed December 27, 1922. Serial No. 609,209.

*To all whom it may concern:*

Be it known that I, HARRY A. BERKOWITZ, a citizen of the United States, residing at Wilkes-Barre, in the county of Luzerne and State of Pennsylvania, have invented certain new and useful Improvements in Ice Scrapers for Rails, of which the following is a specification.

My invention relates to improvements in ice scrapers adapted for application for street cars or trains for scraping the ice and snow from these rails, thereby preventing the cars or trains from jumping their tracks.

The primary object of this invention resides in the provision of such a scraping means that may be readily installed upon the wheeled trucks of cars or trains and adjacent the usual track wheels, means being provided for readily extending the scrapers to an operative or inoperative position.

The nature and advantages of the invention will be better understood when the following detailed description is read in connection with the accompanying drawing, the invention residing in the construction, combination, and arrangement of parts as claimed.

In the drawing forming part of this application, like numerals of reference indicate similar parts in the several views, and wherein:—

Figure 1 is a front elevational view of my improved ice scraper, the same being shown as supported upon the usual wheel truck of a street car or train.

Figure 2 is a side elevational view of one of the scraping shoes per se.

Figure 3 is a bottom plan view of the shoe shown in Figure 2, and

Figure 4 is a vertical cross sectional view upon the line 4—4 of Figure 2.

Referring to the drawings, I have shown my device as applied to a wheel truck A of the car or train and forwardly of the car wheels *a*. The device embodies the provision of a pair of scraping shoes 1 at each side of the truck A and in a position to have sliding contact with the car rails *b*, when they are extended to an operative position.

These scraping shoes are loosely interconnected by a cross arm 2, and this cross arm has a central screw threaded bore 3 therein, for receiving the screw threaded end 4 of an operating shaft or rod 5. This shaft or rod is freely rotatable in the bearings upon the adjacent one of the cross bars forming the wheel truck A. The shaft also projects through an opening in the floor board *c* of the car, and has a hand wheel 7 upon its upper end, whereby the scraping shoes 1 may be raised or lowered as the occasion demands by the car motor-man or other attendant.

As a means for guiding the shoes 1 in their upper and lower movement, and for maintaining the same in proper relation with the rails *b*, each shoe carries a vertically extending rod 8, engaging through an opening in a V-shaped bracket 9, rigidly secured to the undersurface of the before mentioned one of the cross bars forming the wheel truck A. Each rod 8 also extends through a bore in the cross bar of the frame, and as clearly shown in Figure 1.

The scraping shoes are of similar construction although reversely arranged, and each comprises a longitudinally disposed plate having a plane lower edge 10, adapted for sliding contact with the tread of the rails *b* when these shoes are in operative position. The adjacent sides of each of these shoes are provided with a pendent flange or skirt 11, adapted to extend within the rails as more clearly shown in Figures 1 and 4, for scraping the snow and ice from alongside of the treads of these rails. The rail contacting surface of this skirt or flange 11 is curved as more clearly shown in Figure 3, for permitting these shoes to have a slight swinging movement upon the ends of the cross arm 2, when the car is making a turn. The upper end of these shoes are reduced for forming a longitudinal shoulder 12, which shoulder is provided with a screw threaded opening 13 for receiving the lower screw threaded end 14 of the before mentioned guide rods 8. Forwardly of these guide rod connections, each shoe 1, has an opening 15 therein for receiving the ends of the cross arm 2, it being noted that each end of this cross rod has an opening 16 therein for receiving a connecting pin 16 secured within the shoe, and passing through the said openings 15. As shown, the opening 15 in each of the shoes is of greater dimensions than the ends of the cross arm, permitting a relative swinging movement of the shoes upon the ends of this cross arm.

In view of the above description, it will at once be apparent that when the operating shaft 5 is controlled so as to extend the scraping shoes 1 into a rail engaging position as shown in Figures 1, 2 and 4, these shoes will efficiently scrape any snow or ice off of the rails, and will at the same time, provide a groove within the snow or ice between the tracks, and adjacent the treads of the rails for permitting the flanges of the car wheels to ride therein.

While I have herein shown and described the preferred embodiment of the present invention, it is nevertheless to be understood that minor changes may be made therein, without departing from the spirit and scope of the invention as claimed.

What I claim as new is:—

1. In an ice scraper for railway rails, the combination with the wheeled truck of a railway car, a pair of rail scraping shoes arranged in transverse alinement in front of wheels of said truck, a transverse cross arm, means loosely attaching said shoes to the ends of said cross arm for permitting limited movement of the shoes toward and away from each other, vertical guide rods having their lower ends fixed to the rear ends of said shoes, guides carried by the car truck and in which said guide rods are freely slidable and rotatable, and means to raise said cross arm.

2. In an ice scraper for railway rails, the combination with the wheeled truck of a railway car, a pair of rail scraping shoes arranged in transverse alinement in front of wheels of said truck, a transverse cross arm, means loosely attaching said shoes to the ends of said cross arm for permitting limited movement of the shoes toward and away from each other, vertical guide rods having their lower ends fixed to the rear ends of said shoes, guides carried by the car truck and in which said guide rods are freely slidable and rotatable, and means to raise said cross arm, said shoe attaching means embodying sockets in the inner faces of the shoes into which the ends of the cross arm project, the ends of the cross arm having openings, and pins carried by the shoes and passing loosely through said cross arm openings.

In testimony whereof I affix my signature.

HARRY A. BERKOWITZ.